(12) United States Patent
Dubeyko et al.

(10) Patent No.: US 12,164,920 B2
(45) Date of Patent: Dec. 10, 2024

(54) OFFLOADING DATA PROCESSING AND KNOWLEDGE SYNTHESIS

(71) Applicants: Lemon Inc., Grand Cayman (KY); Beijing Youzhuju Network Technology Co. Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co. Ltd., Beijing (CN)

( * ) Notice: Subject to any disclaimer, the term of this patent is extended or adjusted under 35 U.S.C. 154(b) by 216 days.

(21) Appl. No.: 17/984,191

(22) Filed: Nov. 9, 2022

(65) Prior Publication Data
US 2024/0152358 A1 May 9, 2024

(51) Int. Cl.
*G06F 12/12* (2016.01)
*G06F 9/30* (2018.01)
*G06N 3/04* (2023.01)

(52) U.S. Cl.
CPC ...... *G06F 9/30047* (2013.01); *G06F 9/30032* (2013.01); *G06F 9/30189* (2013.01); *G06F 12/12* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 6,760,815 | B1* | 7/2004 | Traversat | G06F 12/0276 |
| | | | | 711/E12.012 |
| 8,935,506 | B1* | 1/2015 | Gopalan | G06F 12/1009 |
| | | | | 711/202 |
| 2015/0286414 | A1* | 10/2015 | Gordon | G06F 3/065 |
| | | | | 711/159 |
| 2022/0222118 | A1* | 7/2022 | Wang | G06F 12/1063 |

FOREIGN PATENT DOCUMENTS

WO WO-2024060710 A1 * 3/2024

* cited by examiner

*Primary Examiner* — Nathan Sadler
(74) *Attorney, Agent, or Firm* — BakerHostetler

(57) ABSTRACT

The present disclosure describes techniques for offloading data processing and knowledge synthesis. A set of flags may indicate information about the memory pages in a first memory and may be manageable by at least one central processing unit (CPU). A memory page may be flushed to a second memory if the memory page is associated with a first flag. The first flag may indicate that the memory page is ready to be flushed to the second memory. The second memory may be configured to store a sequence of states of each of the memory pages. Data patterns and relations among the data patterns may be determined by data processing units (DPUs) based on the sequence of states of each of the memory pages. A knowledge base may be built in a third memory based on the data patterns and the relations among the data patterns.

20 Claims, 20 Drawing Sheets

1300

1400

Configure a first memory for temporarily storing memory pages, wherein a set of flags are configured to indicate information about the memory pages, and wherein the set of flags are manageable by at least one central processing unit (CPU) 1402

Flush a memory page among the memory pages from the first memory to a second memory based on determining that the memory page is associated with a first flag among the set of flags, wherein the second memory is configured to store a sequence of states of each of the memory pages, and wherein the first flag indicates that the memory page is ready to be flushed to the second memory 1404

Determine data patterns and relations among the data patterns by data processing units (DPUs) based on the sequence of states of each of the memory pages in the second memory 1406

Build a knowledge base in a third memory based on the data patterns and the relations among the data patterns, wherein the third memory is a persistent memory 1408

Configure a first memory for temporarily storing memory pages, wherein a set of flags are configured to indicate information about the memory pages 1502

Determine that a memory page in the first memory has a new state based on a second flag among the set of flags 1504

Flush the memory page from the first memory to a second memory by storing the new state in a first input first output (FIFO) queue of the memory page in the second memory, wherein the second memory is configured to store a sequence of states of each of the memory pages 1504

Determine data patterns and relations among the data patterns by data processing units (DPUs) based on the sequence of states of each of the memory pages in the second memory 1506

Build a knowledge base in a third memory based on the data patterns and the relations among the data patterns, wherein the third memory is a persistent memory 1508

OFFLOADING DATA PROCESSING AND KNOWLEDGE SYNTHESIS

BACKGROUND

Companies and/or individuals are increasingly utilizing and/or producing a large quantity of data. Such data may need to be collected and translated into usable information (e.g., processed). Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 14 shows an example process for offloading data processing and knowledge synthesis in accordance with the present disclosure.

FIG. 15 shows an example process for offloading data processing and knowledge synthesis in accordance with the present disclosure.

DETAILED DESCRIPTION OF ILLUSTRATIVE EMBODIMENTS

The central processing unit (CPU) based model of calculation represents one of the key obstacles to enhancing the performance of data processing (e.g., calculations). The CPU-based model of calculation requires moving data and/or code from persistent memory into one or more CPU cache(s). Calculation may be executed by means of sharing one or more CPU core(s) amongst multiple threads of execution. However, this computation paradigm introduces a significant number of drawbacks that prevent improved computation performance. For example, this computation paradigm may cause problems with cache coherence, memory wall, and data moving. Thus, improved techniques for data processing are desirable. Described herein is a hybrid data-centric architecture that is configured to resolve the issues caused by the CPU-based model of computation. Such a hybrid data-centric architecture is illustrated in FIG. 1.

Figure 1:
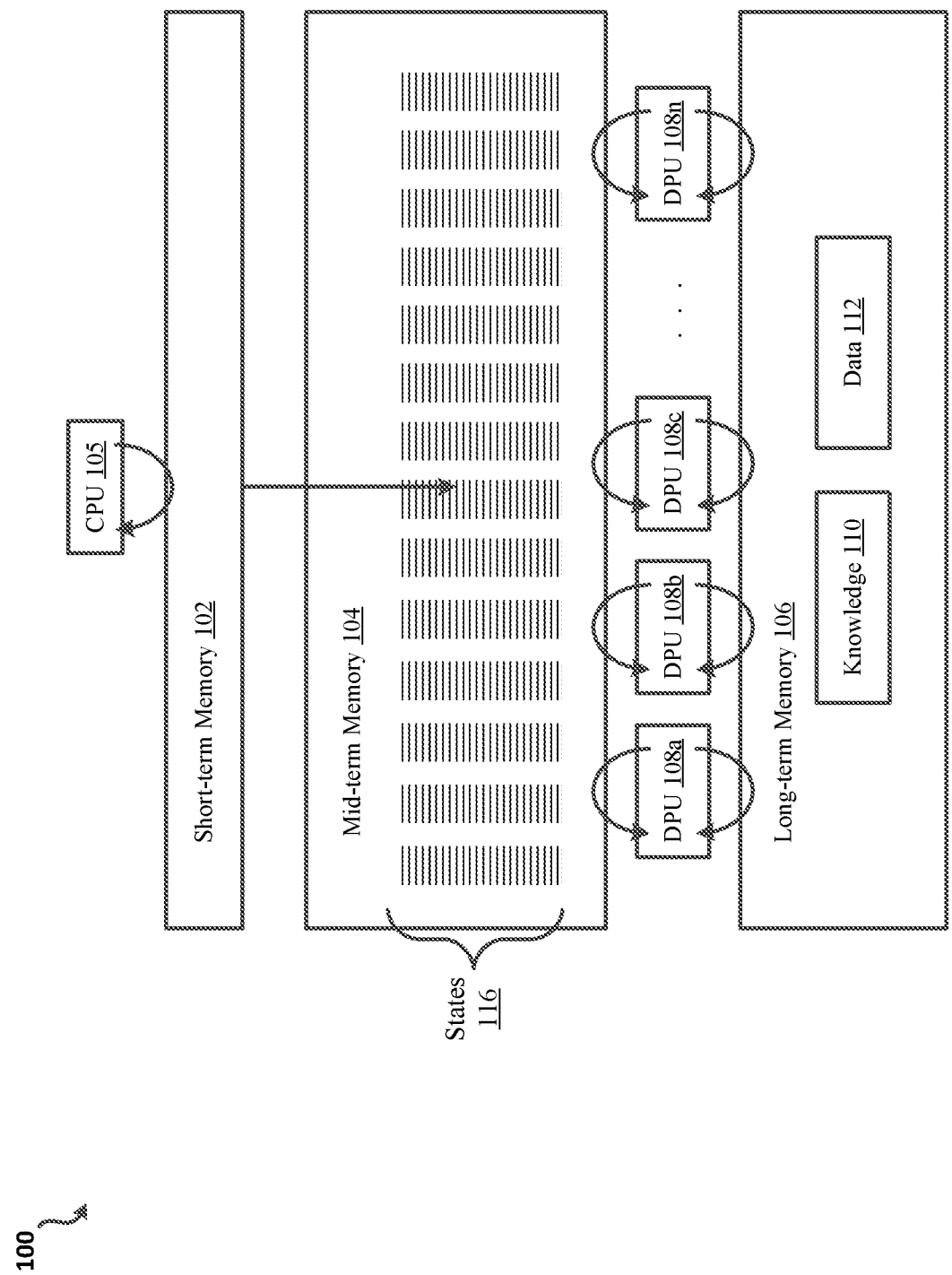
FIG. 1 shows an example framework for offloading data processing and knowledge synthesis in accordance with the present disclosure.

FIG. 1 shows an example framework 100 for offloading data processing and knowledge synthesis in accordance with the present disclosure. The framework 100 includes a CPU (e.g., CPU core(s)) 105, a short-term memory 102, a mid-term memory 104, a long-term memory 106, and one or more data processing units (DPUs) 108a-n.

The short-term memory 102 may be configured to temporarily store (e.g., keep) an application's memory pages. The memory pages associated with an application may comprise data and/or code associated with the application. The short-term memory 102 may be configured to store the memory pages temporarily for access and computation by the CPU 105. The short-term memory 102 may be represented by DRAM, for example.

The mid-term memory 104 may be configured to store several states 116 of one or more memory page(s) associated with the application. The application (or hardware) can periodically save or flush state(s) of memory page(s) from the short-term memory 102 into the mid-term memory 104. Thus, multiple states 116 of the same memory page may be stored in the mid-term memory 104. In certain embodiments, the mid-term memory 104 is persistent memory (e.g., fast persistent memory). In other embodiments, the mid-term memory 104 is not persistent memory. If the mid-term memory 104 is persistent memory, the CPU 105 may be configured to access or retrieve data from the mid-term memory 104 by means of a special memory addressing technique.

The multiple states 116 of the same memory page stored in the mid-term memory 104 may be employed by the DPU(s) 108a-n to recognize repeatable patterns and to build or save the knowledge 110 in the long-term memory 106. The states 116 may be stored as data 112. Alternatively, the states 116 may be deleted without being stored into the long-term memory 106. The long-term memory 106 may be persistent memory. The application may store data in the short-term memory 102 directly into the persistent memory 106. In examples, the mid-term memory 104 may play a role of temporary persistent memory to temporarily keep the states 116 of the memory page. The CPU 105 may be configured to request data processing or retrieval from the long-term memory 106 by means of offloading computation to the DPU(s) 108a-n.

The framework 100 may increase the performance of computation by employing computation near the long-term memory 106 by the DPU(s) 108 *a-n*. The framework 100 depicted in FIG. 1 is capable of synthesizing knowledge of data 112 in the form of a knowledge base 110 stored in the long-term memory 106. The DPU(s) 108*a-n* may utilize this knowledge base 110 to execute computation by means of generalized requests represented by a set of data patterns.

Figure 2:
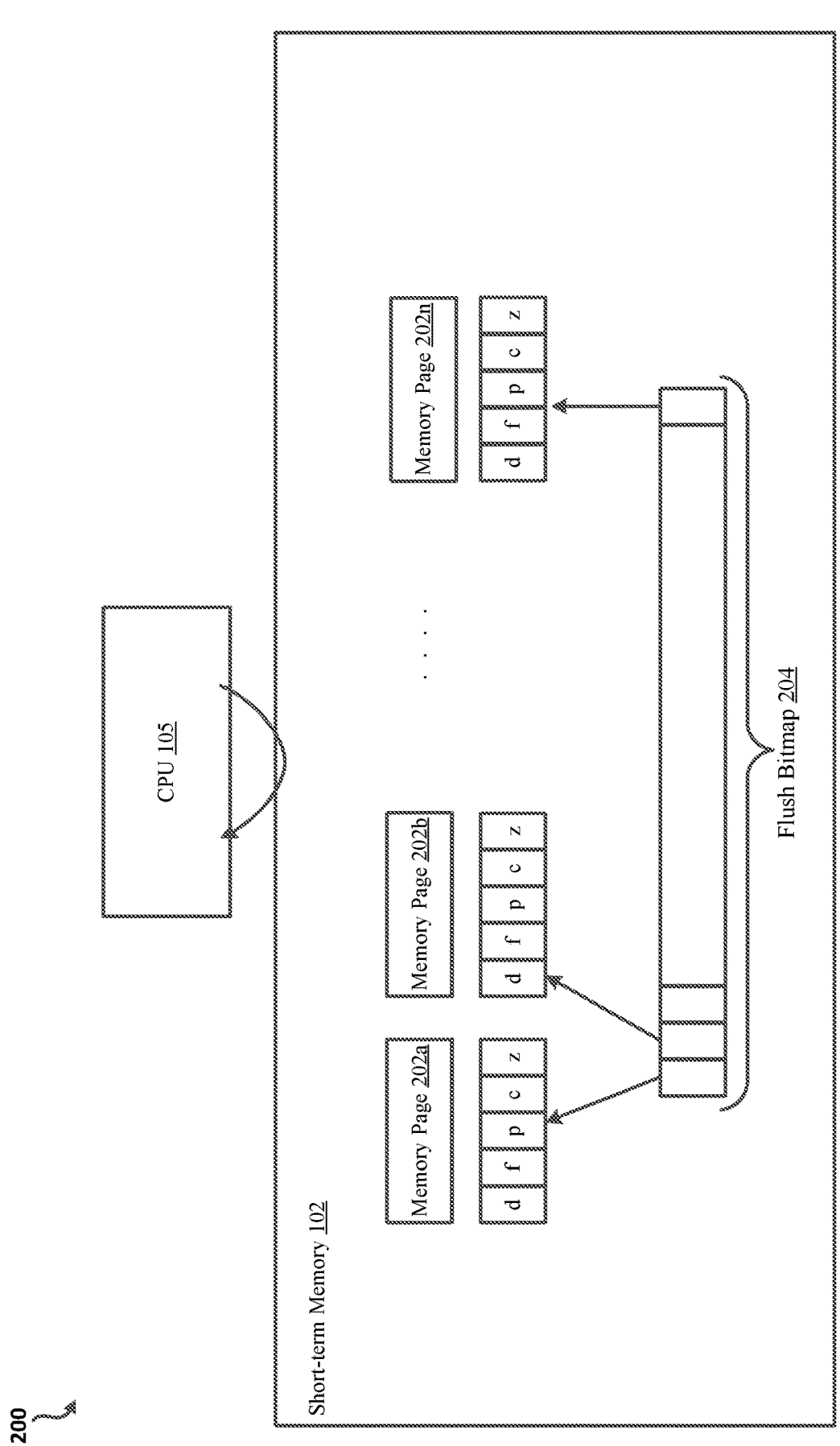
FIG. 2 shows an example diagram illustrating a short-term memory in accordance with the present disclosure.

FIG. 2 shows an example diagram 200 illustrating the short-term memory 102 in accordance with the present disclosure. As described above, the short-term memory 102 may temporarily store (e.g., keep) an application's memory pages (e.g., memory pages 202*a-n*). The memory pages 202*a-n* may comprise data and/or code associated with the application. The short-term memory 102 may represent the main space of the operations of the CPU 105. The CPU 105 may be configured to access, store, allocate, and/or modify data or code by means of memory pages 202*a-n* (for example, 4K). In this manner, the short-term memory 102 does not change the model of CPU operations.

Additionally, the short-term memory 102 may be configured to store a set of flags for every memory page 202*a-n*. In some embodiments, the set of flags for each memory page 202*a-n* may be implemented on a hardware level by circuitry itself. The set of flags for each memory page 202*a-n* may be stored in the short-term memory 102 with the goal of implementing a model of data analysis in the mid-term memory 104. Each memory page 202*a-n* may be associated with one or more flags from the following set of flags: D (e.g., dirty flag) may indicate that the memory page is dirty and/or contains a new state of data, F (e.g., flush flag) may indicate that the memory page needs to be flushed or stored as a new state into the mid-term memory 104, P (e.g., persistent flag) may indicate that the memory page has a persistent copy in the mid-term memory 104, R (e.g., request flag) may indicate that the memory page contains a request to the long-term memory 106, and C (e.g., counter) may indicate a count of persistent states in the mid-term memory 104. These flags (D, F, P, R, C, etc.) and/or any additional flags can be set by application logic and/or by hardware logic.

If a memory page 202*a-n* is associated with a dirty flag, this may indicate that data in that memory page has been modified and is different than the state stored in the mid-term memory 104. If a memory page 202*a-n* is associated with a flush flag, the flush flag may mark the point in time when that memory page's state needs to be stored or flushed into the mid-term memory 104. If a memory page 202*a-n* is both marked as dirty and is associated with a flush flag, then a flush bitmap 204 may contain a set bit for this particular memory page. The flush bitmap 204 may provide a way to detect and flush dirty memory pages 202*a-n* (e.g., such as by a management unit of the short-term memory 102).

If a memory page 202*a-n* is associated with a persistent flag, this may indicate that the memory page has persistent states in the mid-term memory 104. The counter may be configured to keep the number of such persistent states in the mid-term memory 104. The counter may need to be as minimum 1 byte. A memory page 202*a-n* may contain not only data or code, but also a request to the long-term memory 106 to execute some computation. If a memory page 202*a-n* contains such a request, then the request flag may be set for this memory page. Thus, the application or hardware logic may request some computation-in-memory or data analysis in memory by means of setting flags for particular memory page(s) in the short-term memory 102. The short-term memory 102 may be configured to support additional commands to set such flags. The CPU 105 may be configured to issue such commands with the goal to manage flags in the short-term memory 102.

Figure 3:
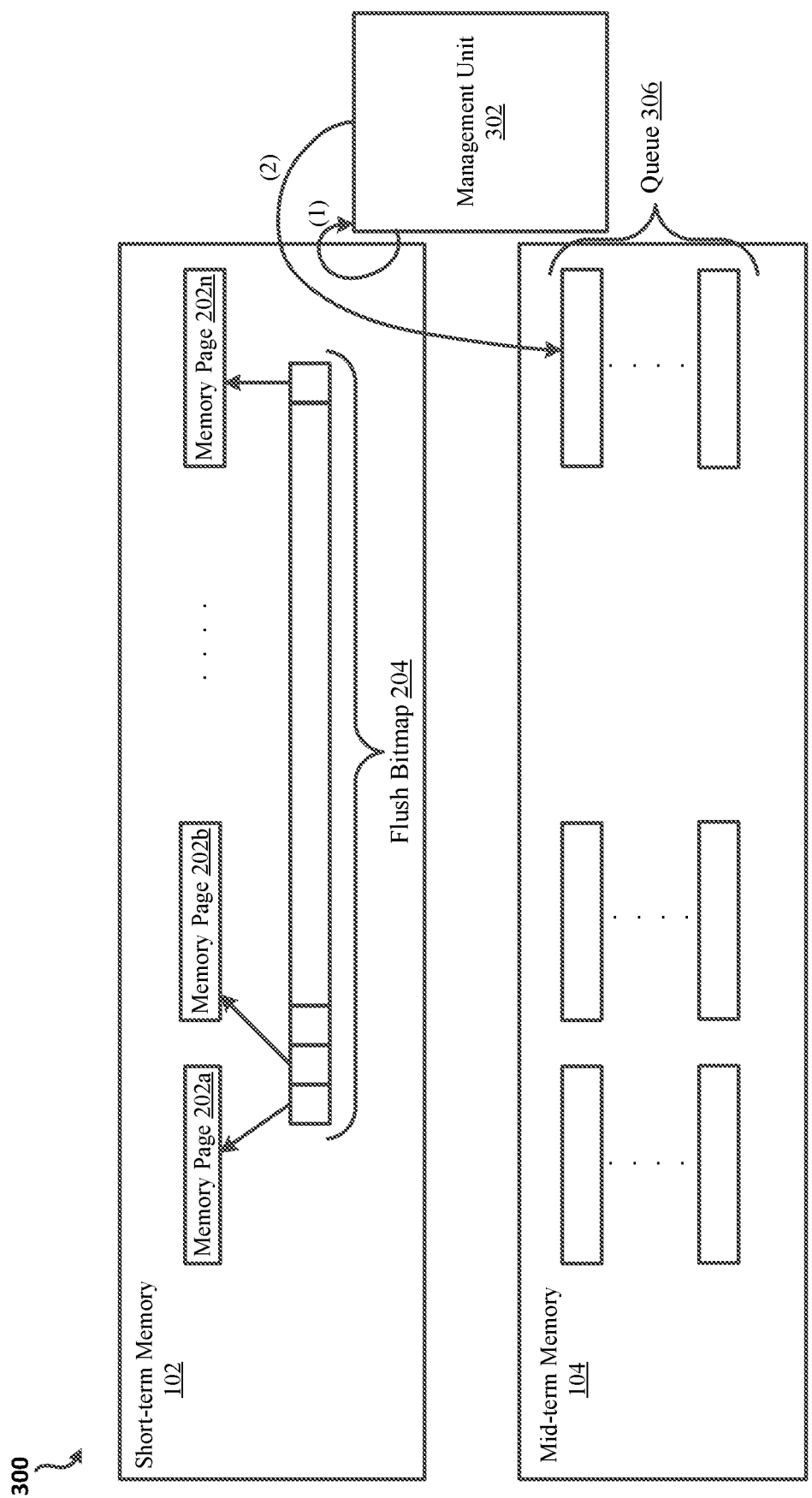
FIG. 3 shows an example diagram illustrating a mid-term memory in accordance with the present disclosure.

FIG. 3 shows an example diagram 300 illustrating the short-term memory 102 and the mid-term memory 104 in accordance with the present disclosure. As described above, the short-term memory 102 can be imagined like a single layer of memory pages 202*a-n* that can be modified by the CPU 105 in a typical manner. However, the CPU 105 can mark some memory pages 202*a-n* in the short-term memory 102 as dirty and ready to be flushed. A management unit (MU) 302 may, at numeral 1, check the flush bitmap 204 to detect dirty pages that are ready to be flushed into the mid-term memory 104. The MU 302 may, for example, be located in the short-term memory 102, in the mid-term memory 104, in a combination of the short-term memory 102 and the mid-term memory 104, or outside of both the short-term memory 102 and the mid-term memory 104.

If the MU 302 detects a memory page 202*a-n* that is ready to be flushed into the mid-term memory, the MU 302 may, at numeral 2, cause a new state of the memory page to be stored in a first input-first output (FIFO) queue 306 of that particular memory page in mid-term memory 104. If the mid-term memory 104 is persistent, the mid-term memory 104 may be imagined like multiple layers of persistent space that can contain a sequence of states (FIFO queue 306) for every memory page 202*a-n* in short-term memory 102. The architecture of a persistent mid-term memory 104 can be used in various ways. First, the application may be configured to utilize the persistent layers of the mid-term memory 104 as a stack. Second, application may be able to rollback some state of a memory page. Third, the storage subsystem may be able to analyze the difference in data states and may be able to recognize repeatable patterns and relations amongst the data patterns.

Figure 4:
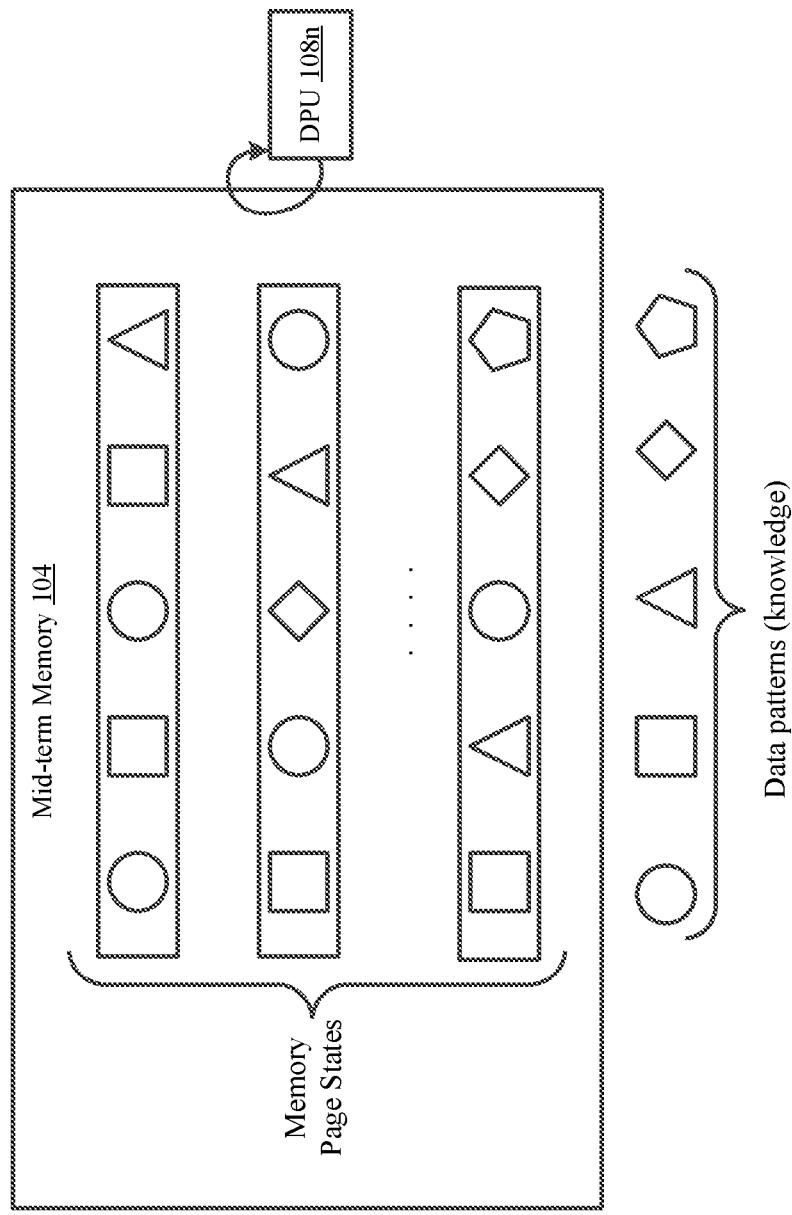
FIG. 4 shows an example framework for data pattern recognition in accordance with the present disclosure.

FIG. 4 shows an example framework 400 for data pattern recognition in accordance with the present disclosure. A binary stream may be represented by a sequence of bytes. A binary stream may contain no information if it includes only one symbol that is repeated for the stream's length. Additionally, or alternatively, a binary stream may contain no information if it includes a completely random set of symbols without any recurrence. Only repeatable patterns in a binary stream may make sense and contain recognizable information. Thus, it may be possible to recognize keywords or other data structure(s) by comparing two binary streams. If it is possible to find the repetition of some pattern in different binary streams, then such pattern may represent some reproducible phenomenon of reality.

The recognition of repeatable patterns may be performed by one or more of the DPUs 108*a-n* in a persistent storage space of a storage device (e.g., mid-term memory 104 represented as a memory chip with DPU cores and/or mid-term memory 104 as part of a storage device) by means of specialized circuitry (e.g., a neural network), as such recognition is a highly compute-intensive task. The mid-term memory 104 may represent the space for analysis of multiple states of the same memory page with the goal to recognize data patterns and/or relations among data patterns. The recognized data patterns and/or relations among data patterns may be utilized to build the knowledge base in the long-term memory 106.

Figure 5:
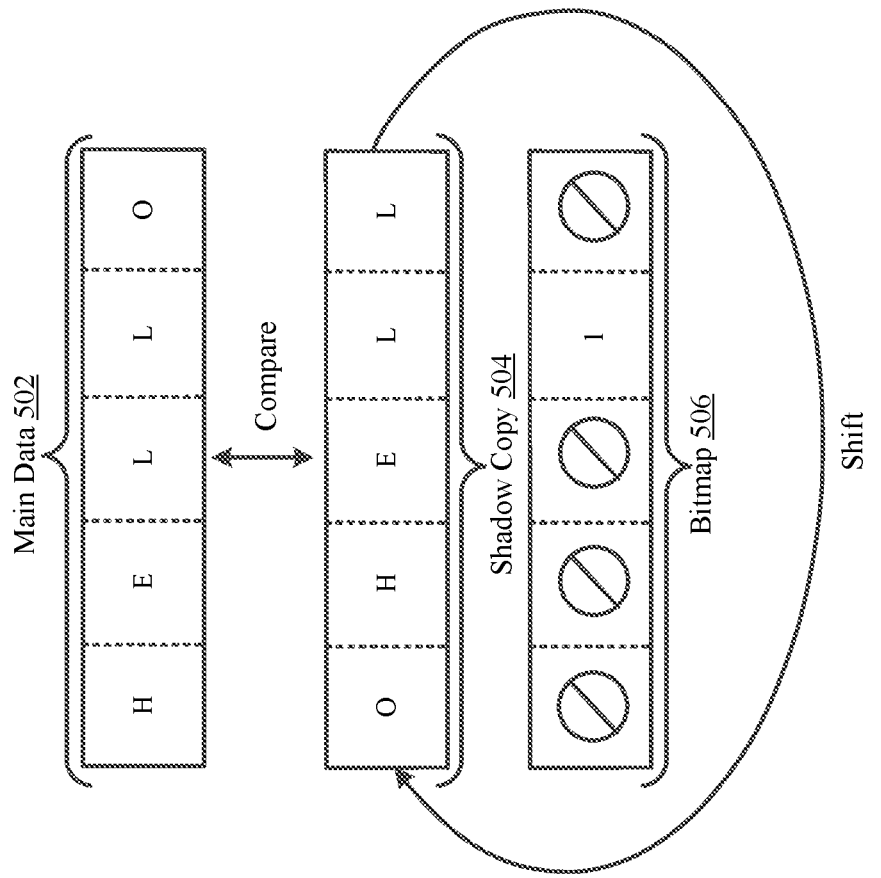
FIG. 5 shows an example framework for bitmap generation in accordance with the present disclosure.

FIG. 5 shows an example framework 500 for bitmap generation in accordance with the present disclosure. A bitmap is a compact and efficient data structure that can be used to recognize repeatable patterns in data. A first memory page (e.g., main data 502) may contain some data content.

A second memory page (e.g., shadow copy 504) may contain the same content or may contain completely different content. The main data 502 and the shadow copy 504 may be compared. A bitmap 506 may represent the result of such comparison. A bit on some position may be configured to store the result of a comparison between the bytes of the main data 502 and the shadow copy 504 for some offset from the beginning of the memory page. In embodiments, one or more shift operations may be applied for the shadow copy 504. For example, a shift operation may be applied for the shadow copy 504 to compare every byte of the main data 502 with every byte of the shadow copy 504. The combination of the comparison and the shift operation(s) may be utilized to build a set of bitmaps. The set of bitmaps may be utilized to discover repeatable patterns in the data content.

Figure 6:
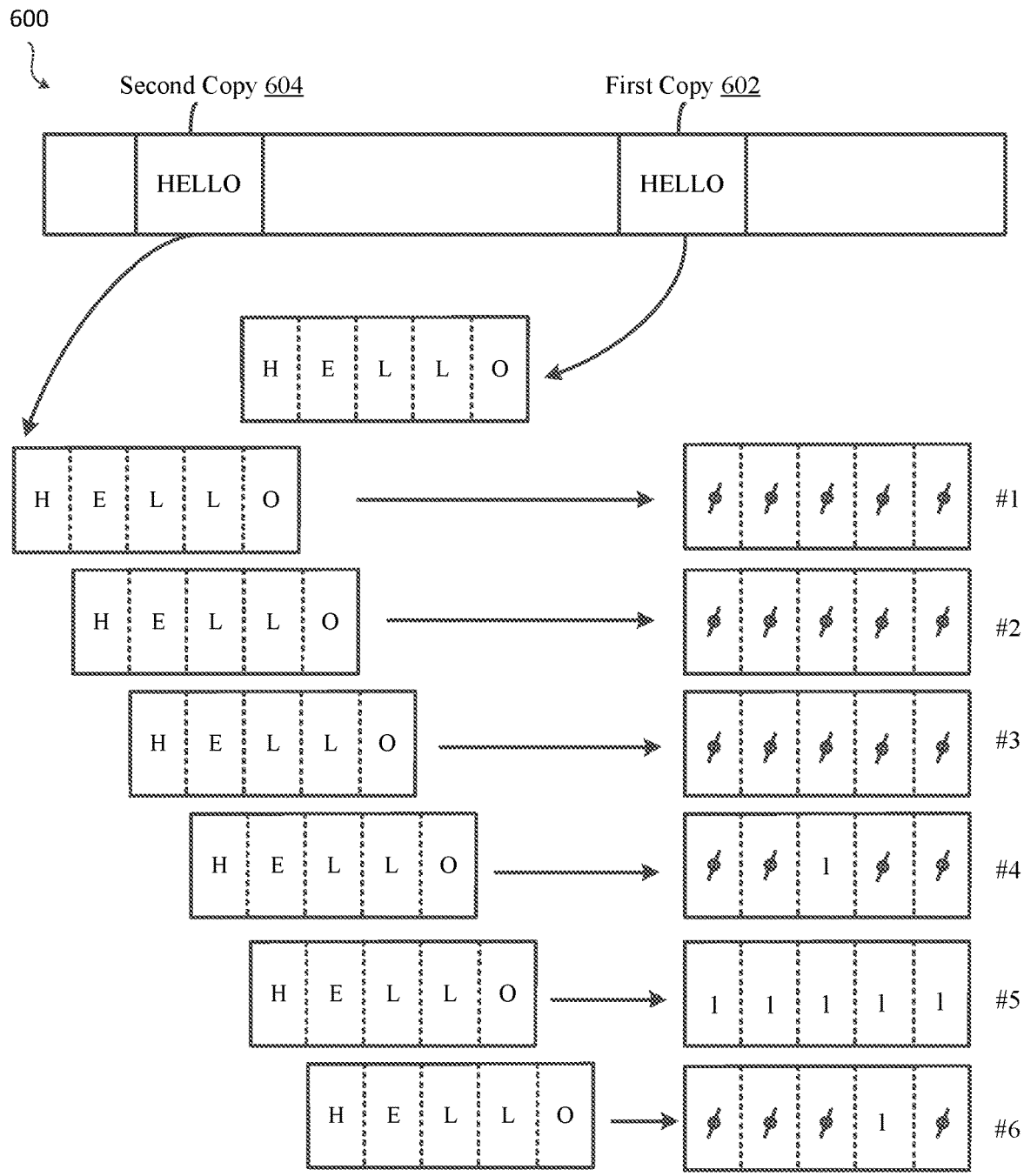
FIG. 6 shows another example framework for bitmap generation in accordance with the present disclosure.

FIG. 6 shows another example framework 600 for bitmap generation in accordance with the present disclosure. The sequence of bitmaps (e.g., bitmaps labeled #1-#6 in the example of FIG. 6) may be generated using a shift operation. Generating the sequence of bitmaps using the shift operation may enable the detection of the positions of repeatable patterns in the data. For example, a binary stream may contain repetition of the word "Hello." A position of a first (e.g., main) copy 602 of "Hello" will coincide with the position of a second (e.g., shadow) copy 604 of the same word after some number of shift operations are applied to the second copy 602 of the data. Thus, one bitmap in the sequence may include a "11111" pattern on the position for the first copy 602 of "Hello" word. For example, the bitmap labeled #5 in the example of FIG. 6 includes a "11111" pattern, as the position of each of the letters H, E, L, L, and O in the first copy 602 coincide with the position of each of the letters H, E, L, L, and O in the second copy 604 after four shift operations have been performed. Another bitmap may include the same pattern "11111" for the second copy 604 of "Hello" word. In this manner, the sequence of bitmaps may reveal repeatable patterns in the memory page.

Figure 7:
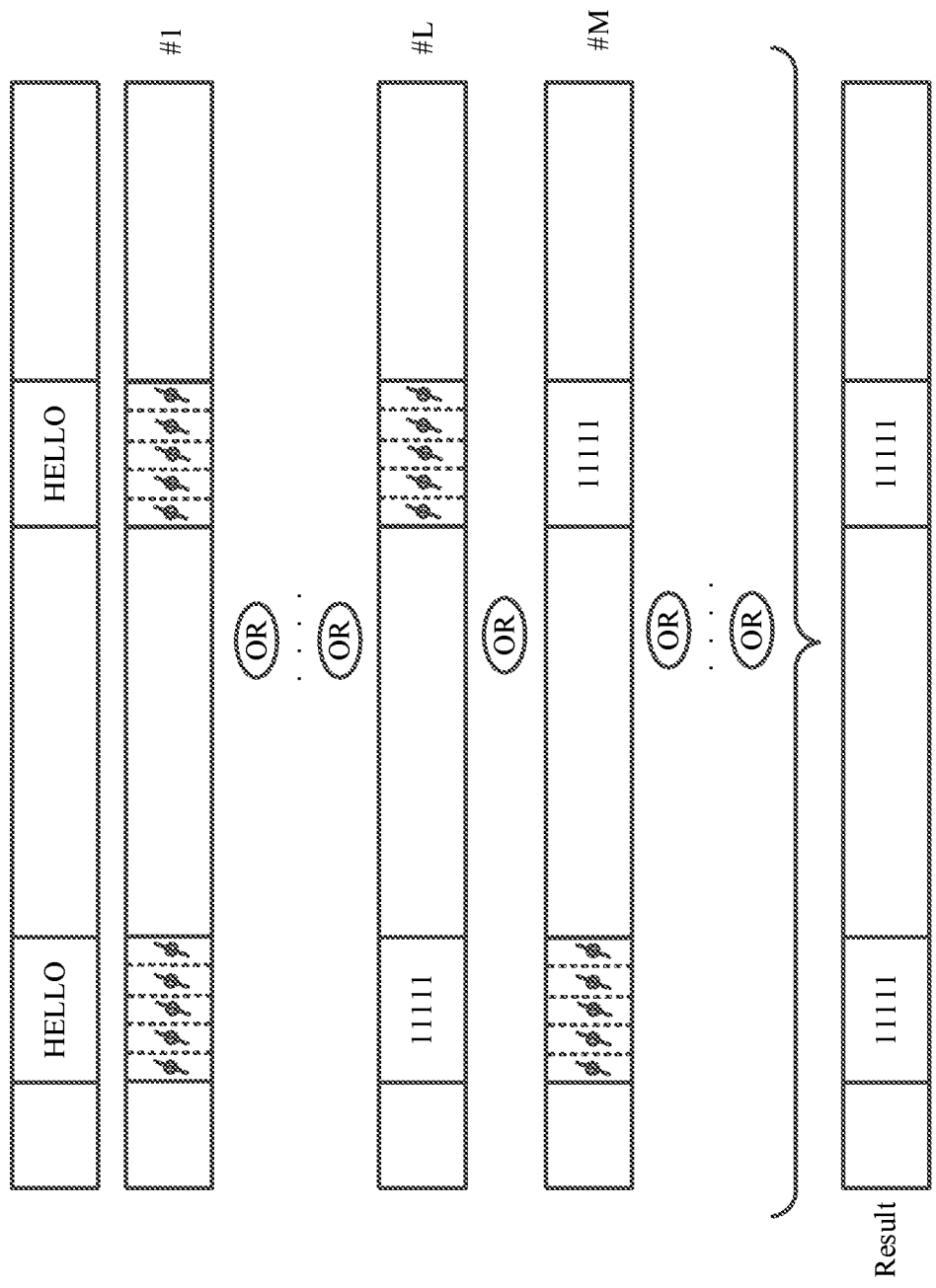
FIG. 7 shows another example framework for bitmap generation in accordance with the present disclosure.

The sequence of bitmaps (e.g., bitmaps labeled #1-#6 in the example of FIG. 6) may be combined into one resulting bitmap. FIG. 7 shows another example framework 700 for bitmap generation in accordance with the present disclosure. A sequence of bitmaps (e.g., bitmaps labeled #1-#6 in the example of FIG. 6 and/or bitmaps labeled #1-#M in the example of FIG. 7) may be combined into one resulting (e.g., combined) bitmap using a bitwise operation (e.g., a bitwise OR operation). The resulting bitmap may contain the contiguous patterns of bits that are set to one value. These detected patterns may be utilized to identify the positions of repeatable patterns in the binary stream of data.

Figure 8:
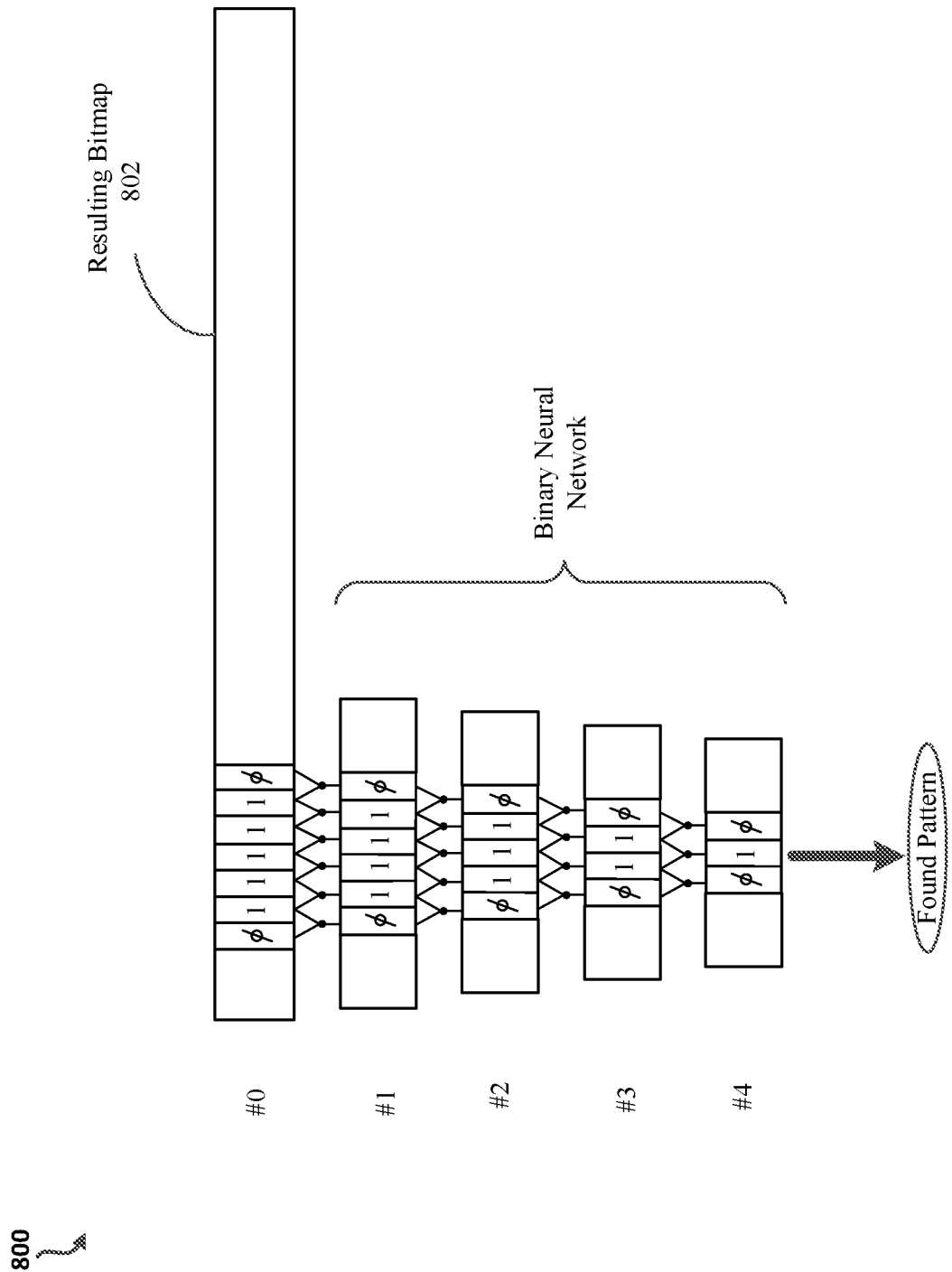
FIG. 8 shows an example framework for searching for patterns in a bitmap in accordance with the present disclosure.

Patterns may be searched for in the resulting bitmap. FIG. 8 shows an example framework 800 for searching for patterns in a bitmap in accordance with the present disclosure. A resulting bitmap 802 may be the basis for searching the repeatable patterns. The search may be implemented, for example, using a binary neural network. The binary neural network may be configured to identify contiguous sequence(s) of bits that contain one value in the resulting bitmap 802. To identify contiguous sequence(s) of bits that contain one value in the resulting bitmap 802, the binary neural network may be configured to compare sibling bits on every level and to transmit on the next level the result of comparison. The comparison function may return the true value ("1") if both sibling bits have the true value ("11"). The length of the discovered pattern and the position of the bit may be utilized to calculate the offset of discovered pattern.

Figure 9:
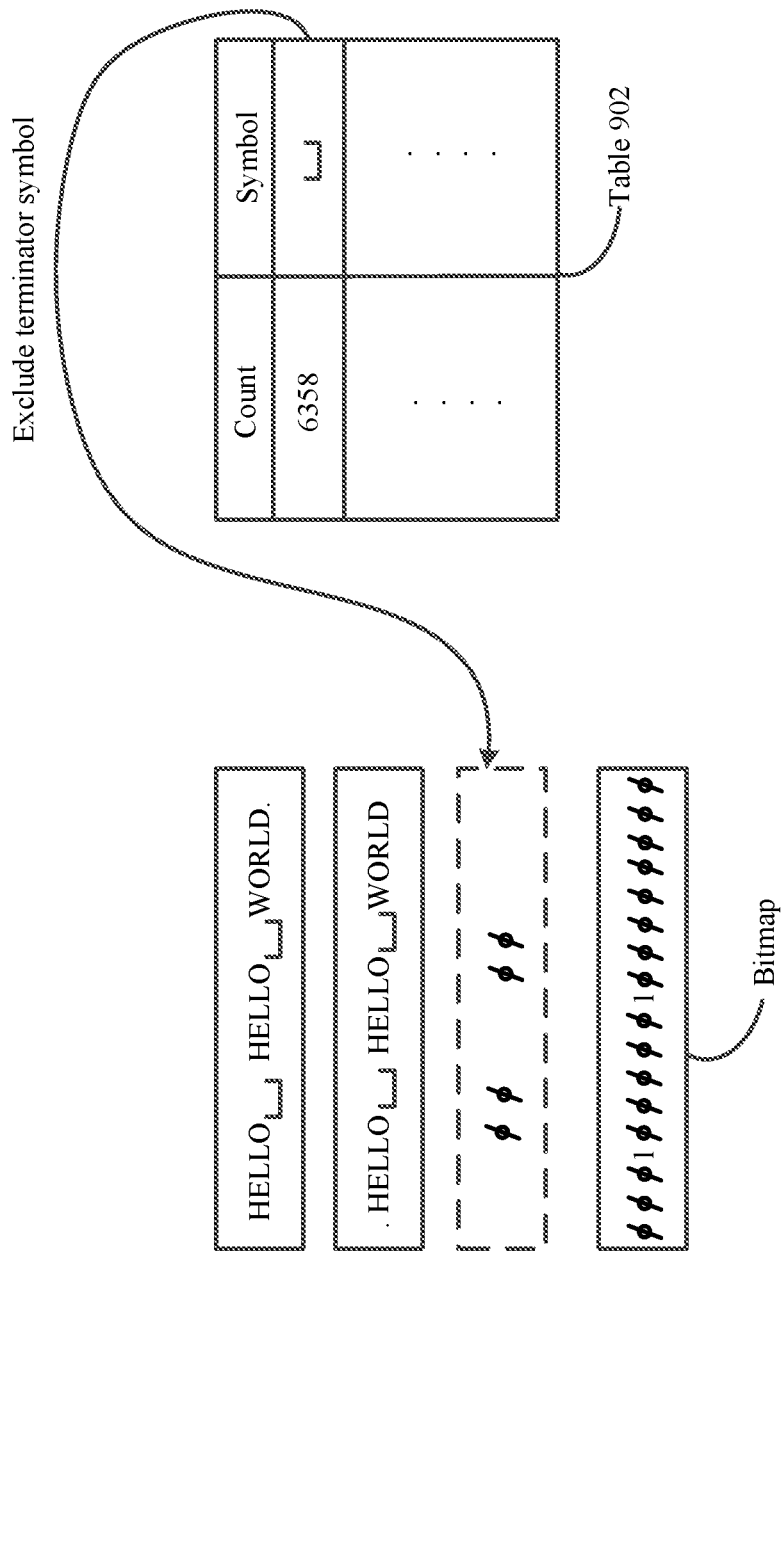
FIG. 9 shows an example framework for terminator symbol exclusion in accordance with the present disclosure.

In embodiments, excluding the termination symbol helps to strengthen the pattern recognition process. FIG. 9 shows an example framework 900 for terminator symbol exclusion in accordance with the present disclosure. The termination symbol exclusion may be an important step, as skipping the termination symbol exclusion may compromise and/or weaken the pattern recognition process. The terminator symbol exclusion procedure may be based on the building of a symbol frequency table 902. The terminator symbol for a particular memory page (e.g., bitstream) may be determined. The terminator symbol for a particular memory page may be the symbol that occurs most frequently (e.g., the greatest number of times) in the memory page.

In the example of FIG. 9, the terminator symbol is the symbol that is present 6358 times in the memory page. To determine the terminator symbol, the number of times that every existing symbol in a memory page occurs may be determined. The terminator symbol may have one of the highest frequencies (e.g., counts) in the table. The bits of the bitmap that are associated with the terminator symbols may be cleared (e.g., before, after, or during generation of the bitmap). Thus, the terminator symbol may be excluded from analysis when the bitstream is analyzed to determine repeatable patterns. In some embodiments, the terminator symbol may not be the symbol with the highest frequency in the table 902. If the terminator symbol is not the symbol with the highest frequency in the table 902, the exclusion algorithm may comprise additional steps to detect and exclude terminator symbol. Terminator symbol exclusion can provide the highest recognition ratio.

Figure 10:
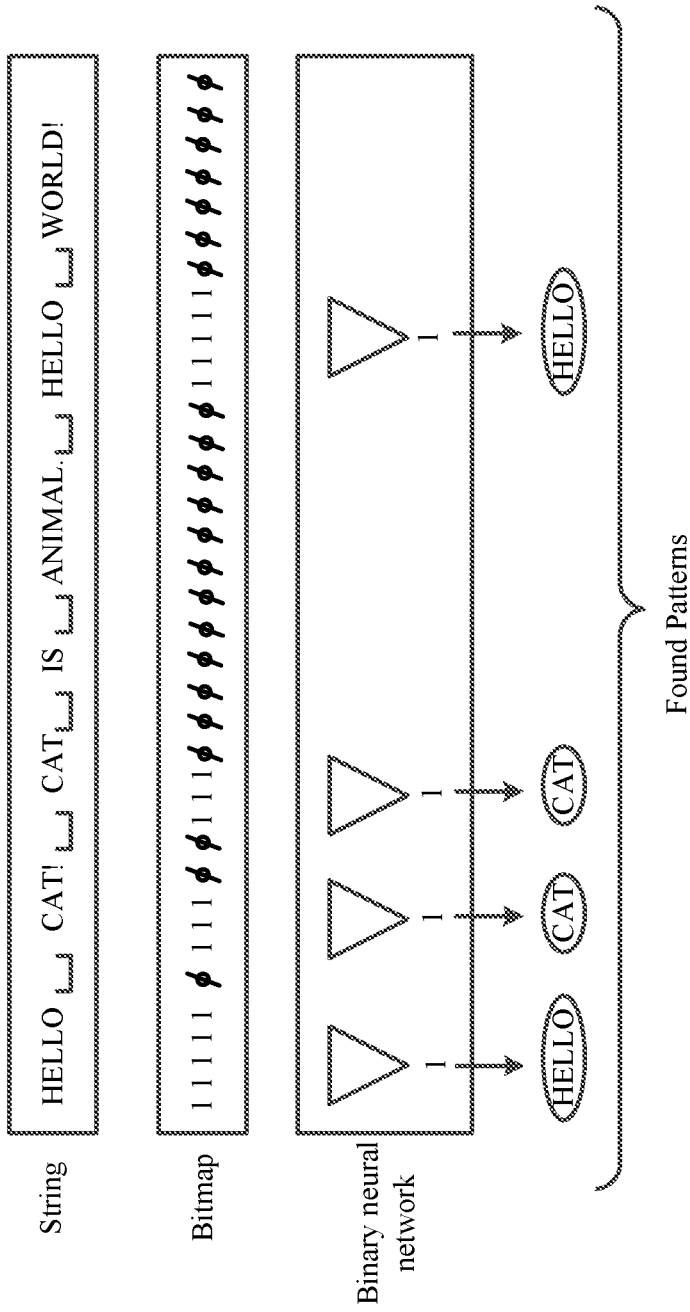
FIG. 10 shows an example framework for knowledge synthesis in accordance with the present disclosure.

FIG. 10 shows an example framework 1000 for knowledge synthesis in accordance with the present disclosure. First, a binary stream of data may be prepared. For example, a string of data may be prepared. Second, a bitmap may be built. The bitmap may be built by comparing a main copy of the binary stream with a shadow copy of the binary stream using the shift operation. Partial bitmaps may be merged using a bitwise operation, such as a bitwise OR operation. Third, the repeatable patterns may be recognized using the resulting bitmap. For example, a binary neural network may be utilized to recognize the repeatable patterns. Fourth, the found patterns may be extracted. The extracted patterns and relations among the patterns may be stored, such as in the long-term memory 106.

Figure 11:
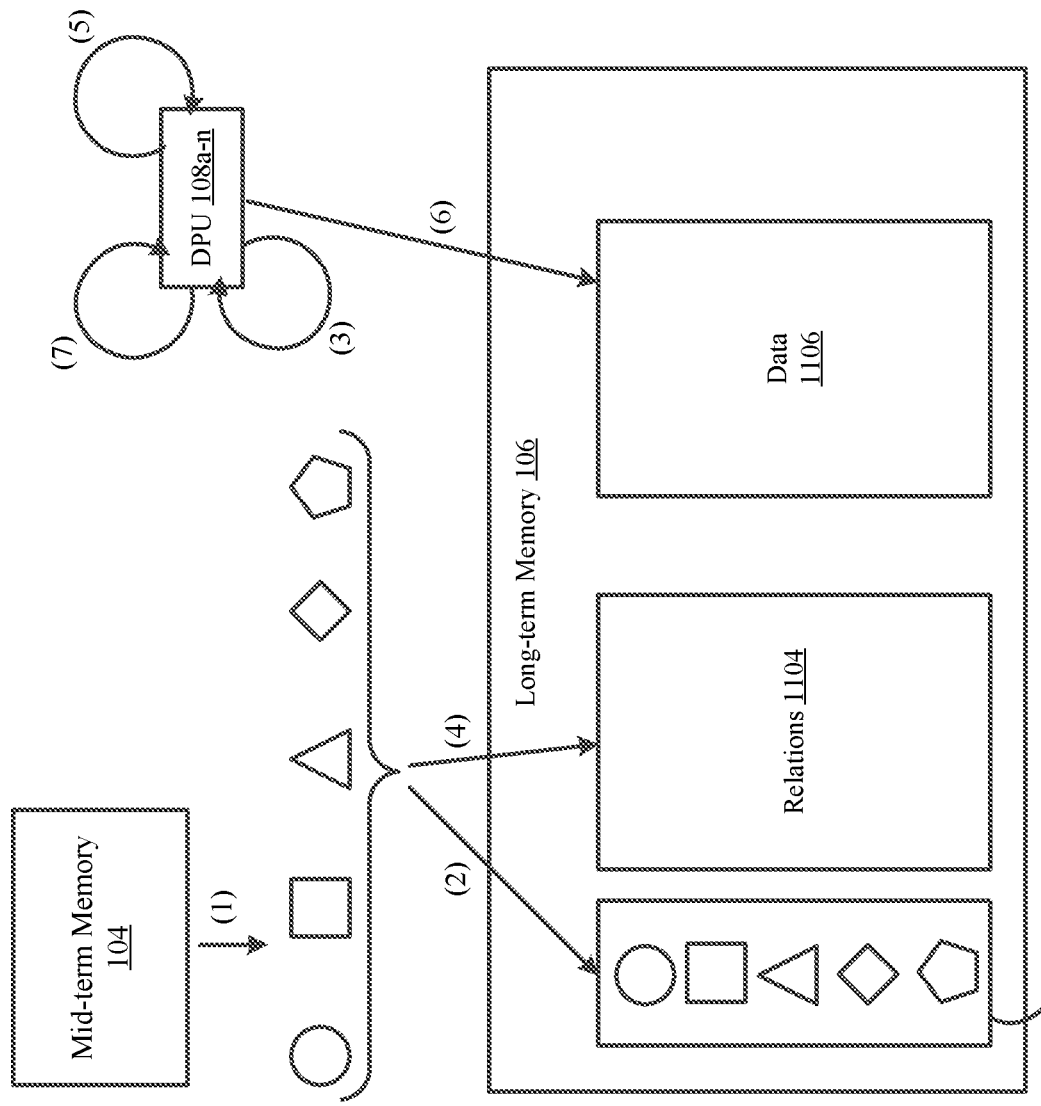
FIG. 11 shows another example framework for knowledge synthesis in accordance with the present disclosure.

FIG. 11 shows another example framework 1100 for knowledge synthesis in accordance with the present disclosure. The mid-term memory 104 may be the space where data patterns and data relations are recognized. Multiple DPUs 108a-n may independently analyze the memory page(s) state in the mid-term memory 104 with the goal to recognize data patterns and relations. The long-term persistent memory 106 may store the knowledge base. This knowledge base can be represented by a dictionary 1102, a relations table 1104, and a data storage 1106. To analyze data in the mid-term memory 104 and build the knowledge base, the DPUs 108a-n may, at numeral 1, recognize data patterns in a resulting bitmap. At numeral 2, the data patterns may be stored in the dictionary 1102 in the long-term memory 106. At numeral 3, data relations may be recognized by the DPU(s) 108a-n. At numeral 4, the data relations knowledge may be stored in the long-term memory 106, such as in relations table 1104. At numeral 5, repeatable data structures may be recognized. At numeral 6, data may be stored, such as in a data storage 1106. In this manner, the knowledge base may be built by DPUs 108a-n without any special algorithm or management from the host side (e.g., from CPU 105).

Each time a new state of a memory page is stored in the mid-term memory 104, this may service as or initiate a request to process or recognize data patterns and relations by the DPUs 108a-n. As a result, the knowledge base can be the basis to synthesize data by the DPUs 108a-n on the basis of requests from the host side. However, such requests can be executed by the DPUs 108a-n without any algorithms or management activity form the host side (e.g., from CPU 105). Generally speaking, the CPU can prepare the memory page(s) in short-term memory 102 that can represent the request to search data or to manipulate data in the knowledge base by means of the DPUs 108a-n in the memory space.

Figure 12:
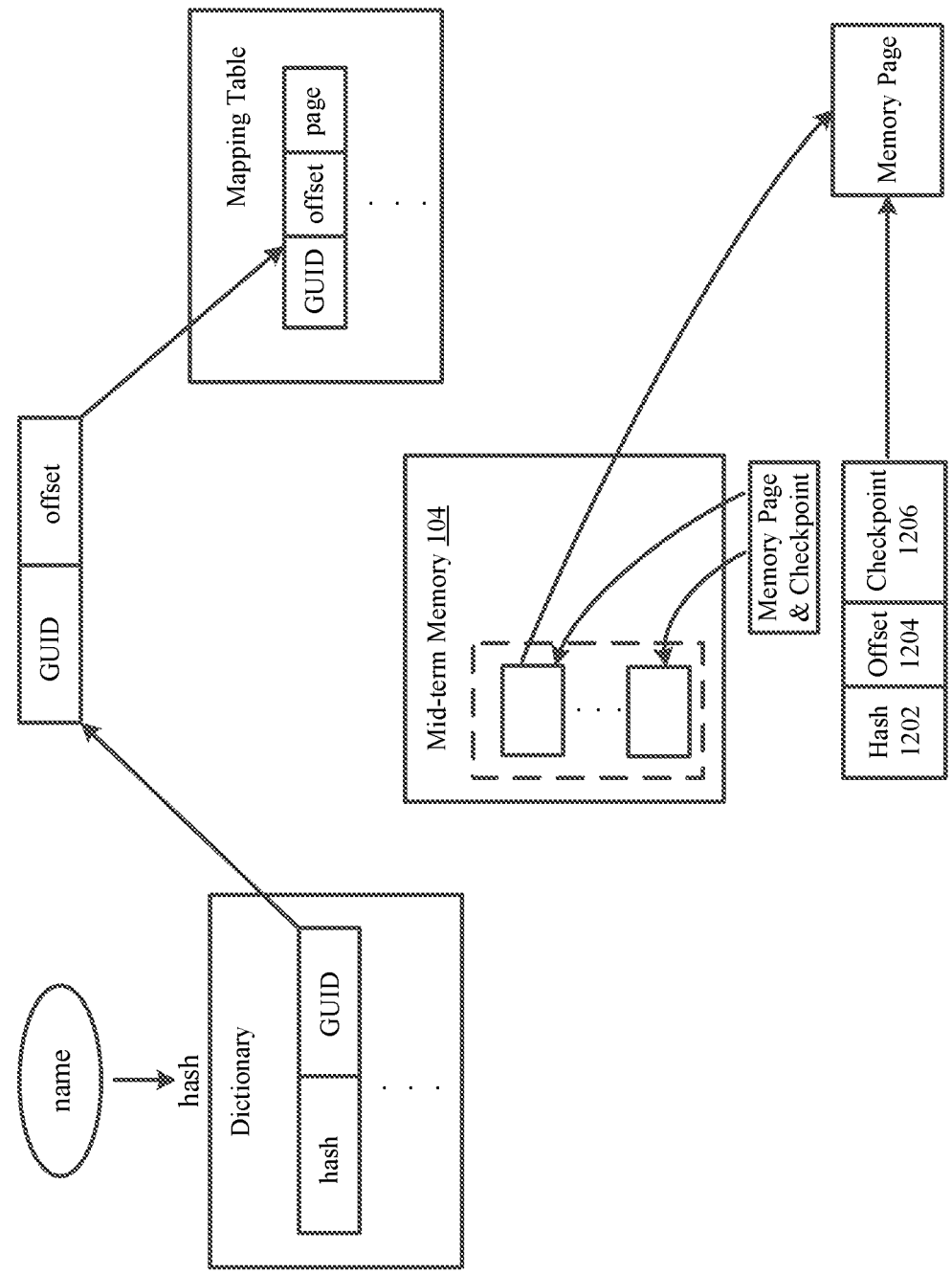
FIG. 12 shows an example framework for data retrieval in accordance with the present disclosure.

A host (e.g., CPU) has various ways of interacting with memory. In some embodiments, the host may use a memory addressing technique. The memory addressing technique may be utilized to access or retrieve data from the mid-term memory 104 into the short-term memory 102 by means of special addressing scheme. FIG. 12 shows an example framework 1200 for data retrieval in accordance with the present disclosure. To access some data, the host may provide an address. The address may include a hash 1202, an offset 1204, and a checkpoint 1206. For example, names may be utilized to identify the locations in memory. As a result, every name may be converted into a hash value. The hash value 1202 may be utilized to retrieve a globally unique identifier (GUID) from the dictionary that associates the hash, the GUID, and some memory addresses range. The offset value 1204 may be used as logical index of a memory page in the range and a byte offset inside of that particular memory page. Thus, the combination of the GUID and the offset 1204 may be utilized to identify a physical memory page in the mapping table. Finally, the checkpoint (e.g., timestamp) 1206 can be used to identify a state of the memory page in the mid-term memory 104. This state of the memory page may be retrieved from the mid-term memory 104 into the short-term memory 102. Such an addressing scheme may be used if an application needs to manage data in memory by its own algorithm(s) and to employ the opportunity of multiple memory page states in the mid-term memory 104.

Figure 13:
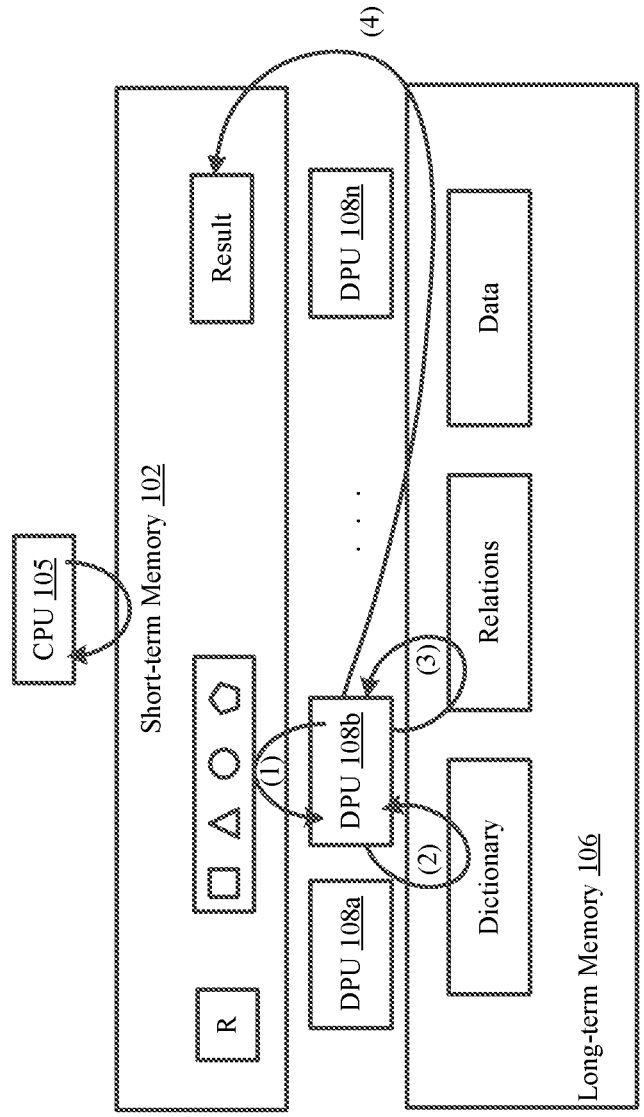
FIG. 13 shows an example framework for data processing and retrieval in accordance with the present disclosure.

In other embodiments, the host (e.g., CPU) can interact with memory via request-based data access and processing. FIG. 13 shows an example framework 1300 in accordance with the present disclosure. Another way for the CPU to process or retrieve data is by offloading data processing request(s) into the long-term memory 106. The CPU may prepare a memory page in the short-term memory 102. This memory page may contain data patterns (e.g., keywords) that are generated or placed into the memory page in some order. Data patterns may represent keywords that the DPUs 108a-n can use for searching in the dictionary of the knowledge base. The order of the data patterns may define the relations amongst the data patterns that the DPUs 108a-n need to identify in the relations knowledge base. Finally, a prepared memory page may be marked as a request in the short-term memory 102.

The setting request flag for particular memory page may imply that the host has requested the offloading of data search or modification into the long-term memory space. One (or several) DPU(s) 108a-n may receive the memory page for processing. The DPU(s) 108a-n may retrieve the data pattern and execute the search of a data pattern in the dictionary. The data pattern may not be found. If the data pattern is not found, then this particular data pattern is ignored. If the data pattern is found, the DPU(s) 108a-n may identify the relation(s) that particular data pattern has with neighboring data patterns in the request page. If relations cannot be found in the relations knowledge base, then the data pattern is excluded from the final result. Otherwise, the DPU(s) 108a-n may extract found data patterns and the associated raw data as a result of the operation.

The found data may at first be represented by some metadata. If the host can retrieve the result of request, then data can be retrieved into the short-term memory on the basis of prepared metadata. Oppositely, the result of operation may be used as the basis for the next operation with the found data. In this manner, the host may offload computation into the memory space. The computation is executed by the DPUs 108a-n and the host does not need to spend CPU resources for data processing computation.

The DPUs 108a-n may execute the computation in a massively parallel manner to significantly improve performance of the data processing operations and to decrease power consumption. Offloading data processing into a persistent memory space (near-data computation) may address the memory wall problem, throughput bottleneck, and/or the data moving problem. The hybrid data-centric architecture described herein provides a way to build the knowledge base and to synthesize data in the memory space without any algorithms or management from the host side. The techniques described herein may build an efficient infrastructure for synthesizing and executing artificial intelligence algorithms.

FIG. 14 illustrates an example process 1400. The process 1400 may be performed for knowledge synthesis. The process 1400 may be performed by one or more components of the framework 100 depicted in FIG. 1. Although depicted as a sequence of operations in FIG. 14, those of ordinary skill in the art will appreciate that various embodiments may add, remove, reorder, or modify the depicted operations.

At 1402, a first (e.g., short-term) memory may be configured. The first memory may be configured for temporarily storing memory pages. The memory pages may be associated with an application. The memory pages associated with an application may comprise data and/or code associated with the application. The first memory may temporarily store the memory pages for access and computation by at least one CPU. The first memory may be represented by DRAM, for example.

The first memory may be configured to store a set of flags for every memory page. The set of flags may be configured to indicate information about the corresponding memory pages. The set of flags for each memory page may be stored in the first memory with the goal of implementing a model of data analysis in a second (e.g., mid-term) memory. The set of flags for each memory page may be implemented on a hardware level by circuitry itself. For example, each memory page may be associated with one or more flags from the following set of flags: D (e.g., dirty flag) may indicate that the memory page is dirty and/or contains a new state of data, F (e.g., flush flag) may indicate that the memory page needs to be flushed or stored as a new state into the mid-term memory 104, P (e.g., persistent flag) may indicate that the memory page has a persistent copy in the mid-term memory 104, R (e.g., request flag) may indicate that the memory page contains a request to the long-term memory 106, and C (e.g., counter) may indicate a count of persistent states in the mid-term memory 104. These flags (D, F, P, R, C, etc.) can be set by application logic and/or by hardware logic. The set of flags may be manageable by the at least one CPU.

At 1404, a memory page among the memory pages may be flushed from the first memory to the second memory. The second memory may be configured to store several states of one or more memory page(s) associated with the application. The application (or hardware) can periodically save or flush the states of memory page(s) from the first memory into the second memory. Thus, multiple states of the same memory page may be stored in the second memory. The memory page may be flushed to the second memory based on determining that the memory page is associated with a first flag (e.g., a flush flag) among the set of flags. The second memory may be configured to store a sequence of states of each of the memory pages. The first flag may indicate that the memory page is ready to be flushed to the second memory.

The multiple states of the same memory page stored in the second memory may be employed by one or more DPU(s) to recognize (e.g., determine) repeatable patterns in the data and to build or save the knowledge of data in a third (e.g., long-term) memory. At 1406, data patterns and relations among the data patterns may be determined by DPUs based on the sequence of states of each of the memory pages in the second memory. At 1408, a knowledge base may be built in the third memory based on the data patterns and the relations among the data patterns. The third memory may be a persistent memory.

FIG. 15 illustrates an example process 1500. The process 1500 may be performed for knowledge synthesis. The process 1500 may be performed by one or more components of the framework 100 depicted in FIG. 1. Although depicted as a sequence of operations in FIG. 15, those of ordinary skill in the art will appreciate that various embodiments may add, remove, reorder, or modify the depicted operations.

At 1502, a first (e.g., short-term) memory may be configured. The first memory may be configured for temporarily storing memory pages. The memory pages may be associated with an application. The memory pages associated with an application may comprise data and/or code associated with the application. The first memory may store the memory pages for access and computation by at least one CPU. The first memory may be represented by DRAM, for example.

The first memory may be configured to store a set of flags for every memory page. The set of flags may be configured to indicate information about the corresponding memory pages. The set of flags for each memory page may be stored in the first memory with the goal of implementing a model of data analysis in a second (e.g., mid-term) memory. For example, each memory page may be associated with one or more flags from the following set of flags: D (e.g., dirty flag) may indicate that the memory page is dirty and/or contains a new state of data, F (e.g., flush flag) may indicate that the memory page needs to be flushed or stored as a new state into the mid-term memory 104, P (e.g., persistent flag) may indicate that the memory page has a persistent copy in the mid-term memory 104, R (e.g., request flag) may indicate that the memory page contains a request to the long-term memory 106, and C (e.g., counter) may indicate a count of persistent states in the mid-term memory 104. These flags (D, F, P, R, C, etc.) can be set by application logic and/or by hardware logic. The set of flags may be manageable by at least one CPU.

At 1504, it may be determined that a memory page in the first memory has a new state. It may be determined that a memory page in the first memory has a new state based on determining that the memory page is associated with a second flag (e.g., a dirty flag) among the set of flags. At 1504, the memory page may be flushed from the first memory to a second (e.g., mid-term) memory by storing the new state of the memory page in the second memory. The second memory may be configured to store a sequence of states of each of the memory pages. For example, the new state of the memory page may be stored in a first input first output (FIFO) queue of the memory page in the second memory.

The multiple states of the same memory page stored in the second memory may be employed by one or more DPU(s) to recognize (e.g., determine) repeatable patterns in the data and to build or save the knowledge of data in a third (e.g., long-term) memory. At 1506, data patterns and relations among the data patterns may be determined by DPUs based on the sequence of states of each of the memory pages in the second memory. At 1508, a knowledge base may be built in the third memory based on the data patterns and the relations among the data patterns. The third memory may be a persistent memory.

Figure 16:
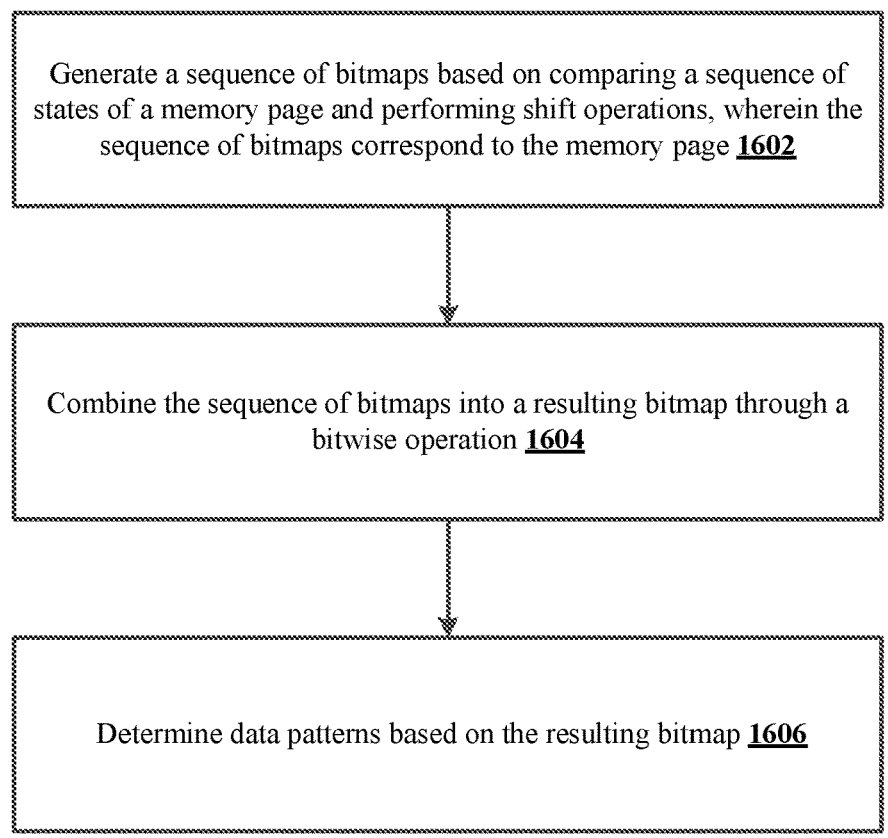
FIG. 16 shows an example process for offloading data processing and knowledge synthesis in accordance with the present disclosure.

FIG. 16 illustrates an example process 1600. The process 1600 may be performed for knowledge synthesis. The process 1600 may be performed by one or more components of the framework 100 depicted in FIG. 1. Although depicted as a sequence of operations in FIG. 16, those of ordinary skill in the art will appreciate that various embodiments may add, remove, reorder, or modify the depicted operations.

A bitmap is a compact and efficient data structure that can be used to recognize repeatable patterns in data. At 1602, a sequence of bitmaps may be generated. The sequence of bitmaps may correspond to a memory page. The sequence of bitmaps may be generated based on comparing a sequence of states of the memory page and performing shift operations. A bitmap may represent the result of such comparison. A bit on some position may be configured to store the result of a comparison. In embodiments, one or more shift operations may be applied for generating the sequence of bitmaps. For example, a shift operation may be applied for a shadow copy to compare every byte of a main copy with every byte of the shadow copy. The combination of the comparison and the shift operation(s) may be utilized to build the sequence of bitmaps. The sequence of bitmaps may be utilized to discover repeatable patterns in the data content.

The sequence of bitmaps may be combined into one resulting bitmap. At 1604, the sequence of bitmaps may be combined into a resulting bitmap. The sequence of bitmaps may be combined into a resulting bitmap through a bitwise operation. The bitwise operation may be a bitwise OR operation, for example. The resulting bitmap may contain the contiguous patterns of bits that are set to one value. These detected patterns may be utilized to identify the positions of repeatable patterns in the binary stream of data.

Patterns may be searched for in the resulting bitmap. At 1606, data patterns may be determined based on the resulting bitmap. The resulting bitmap may be the basis for searching the repeatable patterns. The search may be implemented, for example, using a binary neural network. The binary neural network may be configured to identify contiguous sequence(s) of bits that contain one value in the resulting bitmap. To identify contiguous sequence(s) of bits that contain one value in the resulting bitmap, the binary neural network may be configured to compare sibling bits on every level and to transmit on the next level the result of comparison. The comparison function may return a true value if both sibling bits have the true value. The length of the discovered pattern and the position of the bit may be utilized to calculate the offset of discovered pattern.

Figure 17:
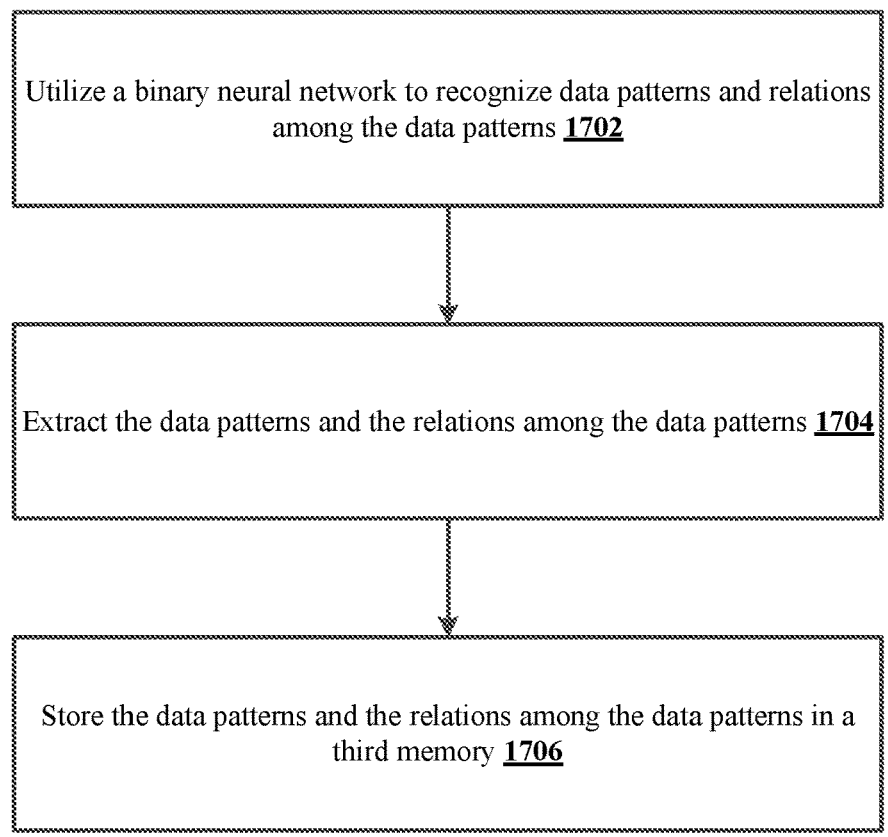
FIG. 17 shows an example process for offloading data processing and knowledge synthesis in accordance with the present disclosure.

FIG. 17 illustrates an example process 1700. The process 1700 may be performed for knowledge synthesis. The process 1700 may be performed by one or more components of the framework 100 depicted in FIG. 1. Although depicted as a sequence of operations in FIG. 17, those of ordinary skill in the art will appreciate that various embodiments may add, remove, reorder, or modify the depicted operations.

Patterns may be searched for in a resulting bitmap. Data patterns may be determined based on the resulting bitmap. The resulting bitmap may be the basis for searching the repeatable patterns. The search may be implemented, for example, using a binary neural network. At 1702, a binary neural network may be utilized to recognize data patterns and relations among the data patterns. The binary neural network may be configured to identify contiguous sequence(s) of bits that contain one value in the resulting bitmap. The binary neural network may be configured to compare sibling bits on every level and to transmit on the next level the result of comparison. The comparison function may return the true value ("1") if both sibling bits have the true value ("11"). The length of the discovered pattern and the position of the bit may be utilized to calculate the offset of discovered pattern.

At 1704, the data patterns and the relations among the data patterns may be extracted. The extracted patterns and relations among the patterns may be stored, such as in a long-term memory. At 1706, the data patterns and the relations among the data patterns may be stored in a third (e.g., long-term) memory.

Figure 18:
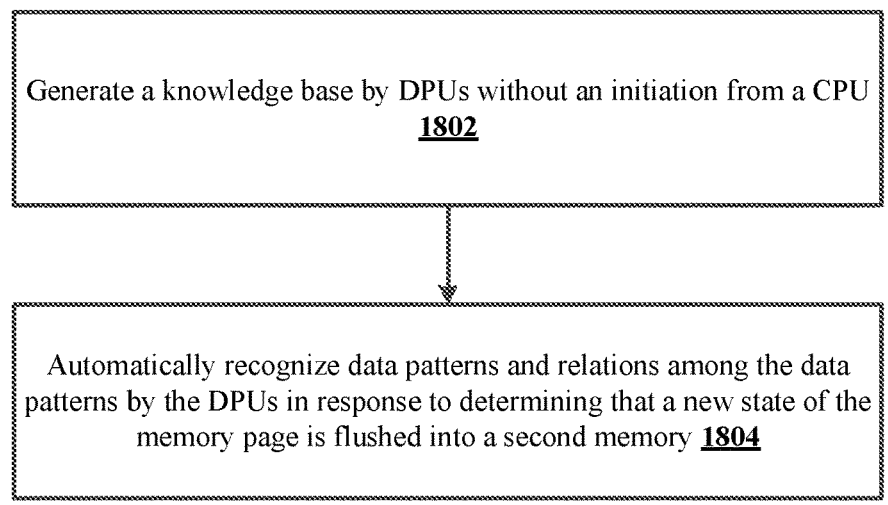
FIG. 18 shows an example process for offloading data processing and knowledge synthesis in accordance with the present disclosure.

FIG. 18 illustrates an example process 1800. The process 1800 may be performed for knowledge synthesis. The process 1800 may be performed by one or more components of the framework 100 depicted in FIG. 1. Although depicted as a sequence of operations in FIG. 18, those of ordinary skill in the art will appreciate that various embodiments may add, remove, reorder, or modify the depicted operations.

At 1802, a knowledge base may be generated. The knowledge base may be generated by DPUs. A second (e.g., mid-term) memory may be the space where data patterns and data relations are recognized. Multiple DPUs may independently analyze the memory page(s) state in the second memory with the goal to recognize data patterns and relations. A third (e.g., long-term persistent) memory may store the knowledge base. This knowledge base can be represented by a dictionary, a relations table, and a raw data storage.

Figure 19:
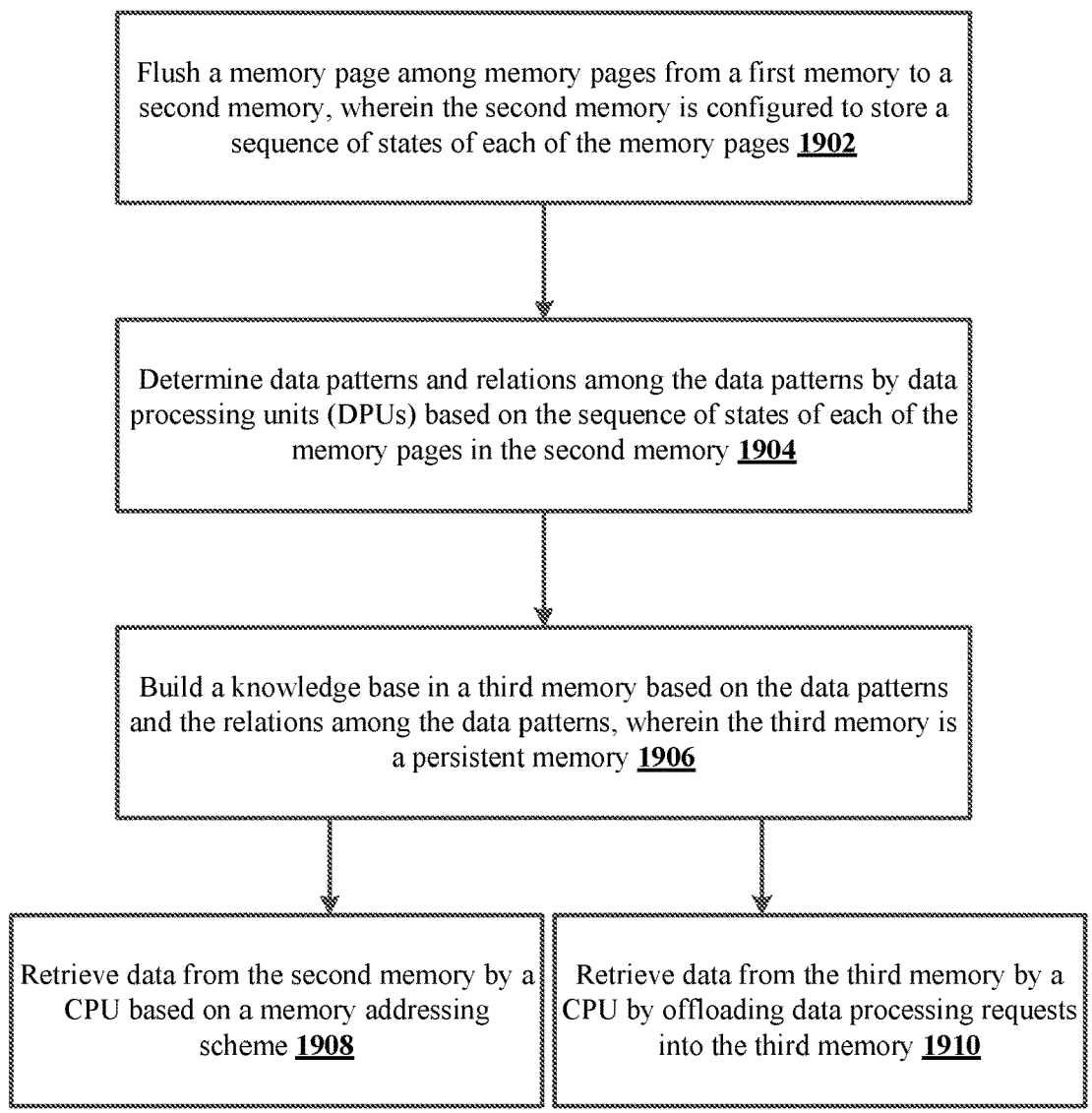
FIG. 19 shows an example process for offloading data processing and knowledge synthesis in accordance with the present disclosure.

To analyze data in the second memory and build the knowledge base, the DPUs may recognize data patterns in a resulting bitmap. The data patterns may be stored in the dictionary in the third memory. Data relations may be recognized by the DPU(s). The data relations knowledge may be stored in the third memory, such as in the relations table. Repeatable data structures may be recognized. Data may be stored, such as in the raw data storage. In this manner, the knowledge base may be built by the DPUs without any special algorithm or management from the host side (e.g., from a CPU). For example, the DPUs may generate the knowledge base without an initiation from a CPU. At 1804, data patterns and relations among the data patterns may be automatically be recognized by the DPUs in response to determining that a new state of the memory page is flushed into a second memory, FIG. 19 illustrates an example process 1900. The process 1900 may be performed for knowledge synthesis. The process 1900 may be performed by one or more components of the framework 100 depicted in FIG. 1. Although depicted as a sequence of operations in FIG. 19, those of ordinary skill in the art will appreciate that various embodiments may add, remove, reorder, or modify the depicted operations.

At 1902, a memory page among the memory pages may be flushed from a first (e.g., short-term) memory to a second (e.g., mid-term) memory. The second memory may be configured to store several states of one or more memory page(s) associated with the application. The application (or hardware) can periodically save or flush the states of memory page(s) from the first memory into the second memory. Thus, multiple states of the same memory page may be stored in the second memory. The memory page may be flushed to the second memory based on determining that the memory page is associated with a first flag (e.g., a flush flag) among the set of flags. The second memory may be configured to store a sequence of states of each of the memory pages. The first flag may indicate that the memory page is ready to be flushed to the second memory.

The multiple states of the same memory page stored in the second memory may be employed by one or more DPU(s) to recognize (e.g., determine) repeatable patterns in the data and to build or save the knowledge of data in a third memory (e.g., long-term memory). At 1904, data patterns and relations among the data patterns may be determined by DPUs based on the sequence of states of each of the memory pages in the second memory. At 1906, a knowledge base may be built in the third memory based on the data patterns and the relations among the data patterns. The third memory may be a persistent memory.

A host (e.g., CPU) may have various ways of interacting with memory. In some embodiments, the host may use a memory addressing technique to interact with the memory. At 1908, data may be retrieved from the second memory by the host (e.g., the CPU). The data may be retrieved from the second memory based on a memory addressing scheme. The memory addressing technique may be utilized to access or retrieve data from the second memory into the first memory by means of special addressing scheme. To access some data, the host may provide an address. The address may include a hash, an offset, and a checkpoint. For example, names may be utilized to identify the locations in memory. As a result, every name may be converted into a hash value. The hash value may be utilized to retrieve a GUID from the dictionary that associates the hash, the GUID, and some memory addresses range. The offset value may be used as logical index of a memory page in the range and a byte offset inside of that particular memory page. Thus, the combination of the GUID and the offset may be utilized to identify a physical memory page in the mapping table. Finally, the checkpoint (e.g., timestamp) can be used to identify a state of the memory page in the second memory. This state of the memory page may be retrieved from the second memory into the first memory. Such an addressing scheme may be used if an application needs to manage data in memory by its own algorithm(s) and to employ the opportunity of multiple memory page states in the second memory.

In other embodiments, the host (e.g., CPU) can interact with memory via request-based data access and processing. At 1910, data may be retrieved from the third memory by the CPU. The data may be retrieved from the third memory by offloading data processing requests into the third memory. The CPU may process or retrieve data by offloading data processing request(s) into the third memory. The CPU may prepare a memory page in the first memory. This memory page may contain data patterns (e.g., keywords) that are generated or placed into the memory page in some order. Data patterns may represent keywords that the DPUs can use for searching in the dictionary of the knowledge base. The order of the data patterns may define the relations amongst the data patterns that the DPUs need to identify in the relations knowledge base. Finally, a prepared memory page may be marked as a request in the first memory.

The setting request flag for a particular memory page may imply that the host has requested the offloading of data search or modification into the third memory space. One (or several) DPU(s) may receive the memory page for processing. The DPU(s) may retrieve the data pattern and execute the search of a data pattern in the dictionary. The data pattern may not be found. If the data pattern is not found, then this particular data pattern is ignored. If the data pattern is found, the DPU(s) may identify the relation(s) that particular data pattern has with neighboring data patterns in the request page. If relations cannot be found in the relations knowledge base, then the data pattern is excluded from the final result. Otherwise, the DPU(s) may extract found data patterns and the associated raw data as a result of the operation.

The found data may at first be represented by some metadata. If the host can retrieve the result of request, then data can be retrieved into the first memory on the basis of prepared metadata. Oppositely, the result of operation may be used as the basis for the next operation with the found data. In this manner, the host may offload computation into the memory space. The computation is executed by the DPUs and the host does not need to spend CPU resources for data processing computation. The DPUs may execute the computation in a massively parallel manner to significantly improve performance of the data processing operations and to decrease power consumption.

Offloading data processing into a persistent memory space (near-data computation) may address the memory wall problem, throughput bottleneck, and/or the data moving problem. The hybrid data-centric architecture described herein provides a way to build the knowledge base and to synthesize data in the memory space without any algorithms or management from the host side. The techniques described herein may build an efficient infrastructure for synthesizing and executing artificial intelligence algorithms.

Figure 20:
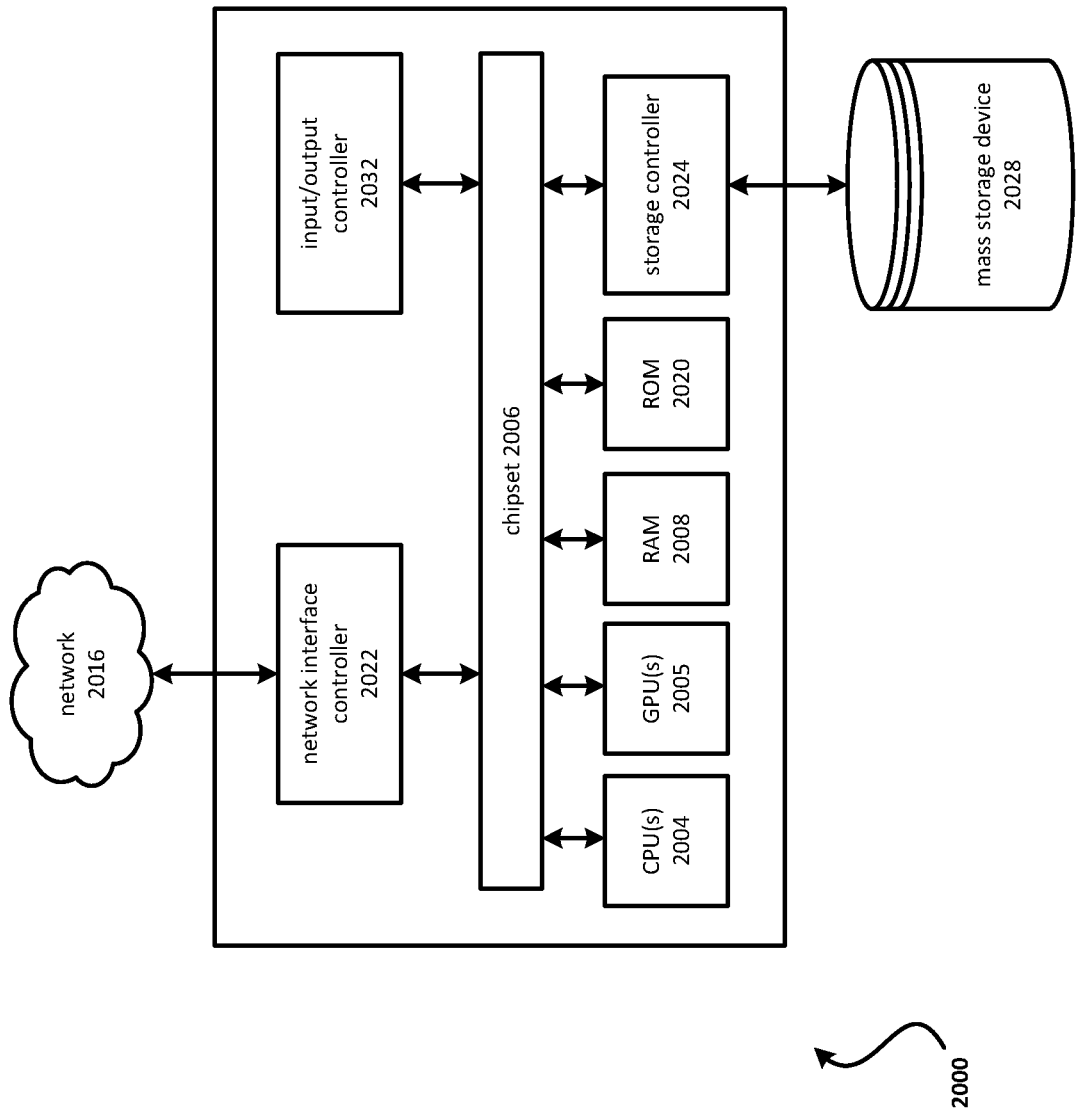
FIG. 20 shows an example computing device which may be used to perform any of the techniques disclosed herein.

FIG. 20 illustrates a computing device that may be used in various aspects, such as the host depicted in FIG. 1. The computer architecture shown in FIG. 20 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 2000 may include a baseboard, or "motherboard," which is a printed circuit board to which a multitude of components or devices may be connected by way of a system bus or other electrical communication paths. One or more central processing units (CPUs) 2004 may operate in conjunction with a chipset 2006. The CPU(s) 2004 may be standard programmable processors that perform arithmetic and logical operations necessary for the operation of the computing device 2000.

The CPU(s) 2004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 2004 may be augmented with or replaced by other processing units, such as GPU(s) 2005. The GPU(s) 2005 may comprise processing units specialized for but not necessarily limited to highly parallel computations, such as graphics and other visualization-related processing.

A chipset 2006 may provide an interface between the CPU(s) 2004 and the remainder of the components and devices on the baseboard. The chipset 2006 may provide an interface to a random-access memory (RAM) 2008 used as the main memory in the computing device 2000. The chipset 2006 may further provide an interface to a computer-readable storage medium, such as a read-only memory (ROM) 2020 or non-volatile RAM (NVRAM) (not shown), for storing basic routines that may help to start up the computing device 2000 and to transfer information between the various components and devices. ROM 2020 or NVRAM may also store other software components necessary for the operation of the computing device 2000 in accordance with the aspects described herein.

The computing device 2000 may operate in a networked environment using logical connections to remote computing nodes and computer systems through local area network (LAN). The chipset 2006 may include functionality for providing network connectivity through a network interface controller (NIC) 2022, such as a gigabit Ethernet adapter. A NIC 2022 may be capable of connecting the computing device 2000 to other computing nodes over a network 2016. It should be appreciated that multiple NICs 2022 may be present in the computing device 2000, connecting the computing device to other types of networks and remote computer systems.

The computing device 2000 may be connected to a mass storage device 2028 that provides non-volatile storage for the computer. The mass storage device 2028 may store system programs, application programs, other program modules, and data, which have been described in greater detail herein. The mass storage device 2028 may be connected to the computing device 2000 through a storage controller 2024 connected to the chipset 2006. The mass storage device 2028 may consist of one or more physical storage units. The mass storage device 2028 may comprise a management component. A storage controller 2024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 2000 may store data on the mass storage device 2028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 2028 is characterized as primary or secondary storage and the like.

For example, the computing device 2000 may store information to the mass storage device 2028 by issuing instructions through a storage controller 2024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 2000 may further read information from the mass storage device 2028 by detecting the physical states or characteristics of one or more particular locations within the physical storage units.

In addition to the mass storage device 2028 described above, the computing device 2000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 2000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 2028 depicted in FIG. 20, may store an operating system utilized to control the operation of the computing device 2000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 2028 may store other system or application programs and data utilized by the computing device 2000.

The mass storage device 2028 or other computer-readable storage media may also be encoded with computer-executable instructions, which, when loaded into the computing device 2000, transforms the computing device from a general-purpose computing system into a special-purpose computer capable of implementing the aspects described herein. These computer-executable instructions transform the computing device 2000 by specifying how the CPU(s) 2004 transition between states, as described above. The computing device 2000 may have access to computer-readable storage media storing computer-executable instructions, which, when executed by the computing device 2000, may perform the methods described herein.

A computing device, such as the computing device 2000 depicted in FIG. 20, may also include an input/output controller 2032 for receiving and processing input from a number of input devices, such as a keyboard, a mouse, a touchpad, a touch screen, an electronic stylus, or other type of input device. Similarly, an input/output controller 2032 may provide output to a display, such as a computer monitor, a flat-panel display, a digital projector, a printer, a plotter, or other type of output device. It will be appreciated that the computing device 2000 may not include all of the components shown in FIG. 20, may include other components that are not explicitly shown in FIG. 20, or may utilize an architecture completely different than that shown in FIG. 20.

As described herein, a computing device may be a physical computing device, such as the computing device 2000 of FIG. 20. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of offloading data processing and knowledge synthesis, comprising:

configuring a first memory for temporarily storing memory pages, wherein a set of flags are configured to indicate information about the memory pages, and wherein the set of flags are manageable by at least one central processing unit (CPU);

flushing a memory page among the memory pages from the first memory to a second memory based on determining that the memory page is associated with a first flag among the set of flags, wherein the second memory is configured to store a sequence of states of each of the memory pages, and wherein the first flag indicates that the memory page is ready to be flushed to the second memory;

determining data patterns and relations among the data patterns by data processing units (DPUs) based on the sequence of states of each of the memory pages in the second memory; and building a knowledge base in a third memory based on the data patterns and the relations among the data patterns, wherein the third memory is a persistent memory.

2. The method of claim 1, further comprising:
determining that the memory page in the first memory has a new state based on a second flag among the set of flags; and
flushing the memory page from the first memory to the second memory by storing the new state in a first input first output (FIFO) queue of the memory page in the second memory.

3. The method of claim 1, further comprising:
generating a sequence of bitmaps based on comparing the sequence of states of the memory page and performing shift operations, wherein the sequence of bitmaps correspond to the memory page;
combining the sequence of bitmaps into a resulting bitmap through a bitwise operation; and
determining the data patterns based on the resulting bitmap.

4. The method of claim 1, further comprising:
utilizing a binary neural network to recognize the data patterns and the relations among the data patterns.

5. The method of claim 4, further comprising:
extracting the data patterns and the relations among the data patterns; and
storing the data patterns and the relations among the data patterns in the third memory.

6. The method of claim 1, further comprising:
generating the knowledge base by the DPUs without an initiation from the CPU.

7. The method of claim 6, further comprising:
automatically recognizing the data patterns and the relations among the data patterns by the DPUs in response to determining that a new state of the memory page is flushed into the second memory.

8. The method of claim 1, further comprising:
retrieving data from the second memory by the CPU based on a memory addressing scheme.

9. The method of claim 1, further comprising:
retrieving data from the third memory by the CPU by offloading data processing requests into the third memory.

10. The method of claim 1, wherein at least one of the second memory or the third memory comprises the DPUs.

11. A non-transitory computer-readable storage medium, storing computer-readable instructions that upon execution by a processor cause the processor to implement operations, the operation comprising:
configuring a first memory for temporarily storing memory pages, wherein a set of flags are configured to indicate information about the memory pages, and wherein the set of flags are manageable by at least one central processing unit (CPU);
flushing a memory page among the memory pages from the first memory to a second memory based on determining that the memory page is associated with a first flag among the set of flags, wherein the second memory is configured to store a sequence of states of each of the memory pages, and wherein the first flag indicates that the memory page is ready to be flushed to the second memory;
determining data patterns and relations among the data patterns by data processing units (DPUs) based on the sequence of states of each of the memory pages in the second memory; and
building a knowledge base in a third memory based on the data patterns and the relations among the data patterns, wherein the third memory is a persistent memory.

12. The non-transitory computer-readable storage medium of claim 11, the operations further comprising:
generating a sequence of bitmaps based on comparing the sequence of states of the memory page and performing shift operations, wherein the sequence of bitmaps correspond to the memory page;
combining the sequence of bitmaps into a resulting bitmap through a bitwise operation; and
determining the data patterns based on the resulting bitmap.

13. The non-transitory computer-readable storage medium of claim 11, the operations further comprising:
utilizing a binary neural network to recognize the data patterns and the relations among the data patterns;
extracting the data patterns and the relations among the data patterns; and
storing the data patterns and the relations among the data patterns in the third memory.

14. A system, comprising:
at least one processor; and
at least one memory comprising computer-readable instructions that upon execution by the at least one processor cause the computing device to perform operations comprising:
configuring a first memory for temporarily storing memory pages, wherein a set of flags are configured to indicate information about the memory pages, and wherein the set of flags are manageable by at least one central processing unit (CPU);
flushing a memory page among the memory pages from the first memory to a second memory based on determining that the memory page is associated with a first flag among the set of flags, wherein the second memory is configured to store a sequence of states of each of the memory pages, and wherein the first flag indicates that the memory page is ready to be flushed to the second memory;
determining data patterns and relations among the data patterns by data processing units (DPUs) based on the sequence of states of each of the memory pages in the second memory; and
building a knowledge base in a third memory based on the data patterns and the relations among the data patterns, wherein the third memory is a persistent memory.

15. The system of claim 14, the operations further comprising:
determining that the memory page in the first memory has a new state based on a second flag among the set of flags; and
flushing the memory page from the first memory to the second memory by storing the new state in a first input first output (FIFO) queue of the memory page in the second memory.

16. The system of claim 14, the operations further comprising:
generating a sequence of bitmaps based on comparing the sequence of states of the memory page and performing shift operations, wherein the sequence of bitmaps correspond to the memory page;
combining the sequence of bitmaps into a resulting bitmap through a bitwise operation; and
determining the data patterns based on the resulting bitmap.

17. The system of claim 14, the operations further comprising:
- utilizing a binary neural network to recognize the data patterns and the relations among the data patterns;
- extracting the data patterns and the relations among the data patterns; and
- storing the data patterns and the relations among the data patterns in the third memory.

18. The system of claim 14, the operations further comprising:
- generating the knowledge base by the DPUs without an initiation from the CPU.

19. The system of claim 18, the operations further comprising:
- automatically recognizing the data patterns and the relations among the data patterns by the DPUs in response to determining that a new state of the memory page is flushed into the second memory.

20. The system of claim 14, the operations further comprising:
- retrieving data from the second memory by the CPU based on a memory addressing scheme; or
- retrieving data from the third memory by the CPU by offloading data processing requests into the third memory.

* * * * *